US010271336B2

(12) United States Patent
Nieman et al.

(10) Patent No.: US 10,271,336 B2
(45) Date of Patent: Apr. 23, 2019

(54) SMART CHANNEL SELECTION FOR AUTONOMOUS GROUP INITIATORS

(71) Applicant: Microsoft Technology Licensing, LLC, Redmond, WA (US)

(72) Inventors: Jacob Nieman, Seattle, WA (US); Kushal Narkhede, Redmond, WA (US); Uday Hegde, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 14/882,196

(22) Filed: Oct. 13, 2015

(65) Prior Publication Data

US 2017/0105222 A1   Apr. 13, 2017

(51) Int. Cl.
*H04W 72/08* (2009.01)
*H04W 76/14* (2018.01)
(Continued)

(52) U.S. Cl.
CPC ......... *H04W 72/08* (2013.01); *H04L 12/2803* (2013.01); *H04W 8/005* (2013.01);
(Continued)

(58) Field of Classification Search
CPC . H04W 76/023; H04W 76/043; H04W 84/18; H04W 84/22; H04W 72/12; H04W 72/1226; H04L 29/08306; H04L 29/08404
See application file for complete search history.

(56) References Cited

U.S. PATENT DOCUMENTS

| 7,230,920 B1 * | 6/2007 | Stratigakis | H04W 48/20 370/230 |
| 7,729,262 B2 * | 6/2010 | Crandall | H04W 72/02 370/238 |

(Continued)

FOREIGN PATENT DOCUMENTS

EP   2 574 134 A1   3/2013

OTHER PUBLICATIONS

International Search Report in counterpart PCT application PCT/US2016/052375, published Nov. 21, 2016.
(Continued)

*Primary Examiner* — Christopher M Crutchfield
(74) *Attorney, Agent, or Firm* — Rainier Patents, PS

(57) ABSTRACT

Smart channel selection for autonomous initiators of peer-to-peer groups is disclosed. A device acting as an initiator device of a peer-to-peer group may configure the group by selecting a channel for the peer-to-peer group, where the selected channel is also the best channel available for potential group member devices to connect to a network having a coverage area in which the initiator device operates. Group member devices operating, or potentially operating, on the peer-to-peer connection will then select the best channel if they connect to the network, and use the same channel for both the peer-to-peer and network connections. Group member devices will then not be required to operate in a multi-channel mode. In embodiments, the best channel may be selected by the initiator device, for example, by determining that the channel has the highest signal strength or the fastest data rate of channels as measured at the group initiator, or by other suitable criteria.

29 Claims, 4 Drawing Sheets

(51) Int. Cl.
  *H04W 84/18* (2009.01)
  *H04W 8/00* (2009.01)
  *H04W 84/12* (2009.01)
  *H04L 12/28* (2006.01)

(52) U.S. Cl.
  CPC ........... *H04W 76/14* (2018.02); *H04W 84/18* (2013.01); *H04W 84/12* (2013.01)

(56) References Cited

U.S. PATENT DOCUMENTS

| | | | |
|---|---|---|---|
| 8,929,822 B2 | 1/2015 | Jung et al. | |
| 9,420,524 B1* | 8/2016 | Dalvi | H04W 48/16 |
| 2005/0119006 A1* | 6/2005 | Cave | H04W 72/02 |
| | | | 455/453 |
| 2007/0115900 A1* | 5/2007 | Liang | H04W 8/245 |
| | | | 370/338 |
| 2008/0102845 A1* | 5/2008 | Zhao | H04W 72/085 |
| | | | 455/450 |
| 2011/0188391 A1* | 8/2011 | Sella | H04W 24/10 |
| | | | 370/252 |
| 2011/0292897 A1* | 12/2011 | Wu | H04W 72/0486 |
| | | | 370/329 |
| 2012/0134349 A1 | 5/2012 | Jung et al. | |
| 2013/0045678 A1 | 2/2013 | Lee | |
| 2013/0148149 A1* | 6/2013 | Park | G06F 3/1296 |
| | | | 358/1.13 |
| 2013/0310064 A1 | 11/2013 | Brachet et al. | |
| 2013/0311947 A1* | 11/2013 | Tsai | G06F 3/04842 |
| | | | 715/815 |
| 2014/0003237 A1 | 1/2014 | Kenney | |
| 2014/0003286 A1 | 1/2014 | Estevez et al. | |
| 2014/0045422 A1 | 2/2014 | Qi et al. | |
| 2014/0092807 A1* | 4/2014 | Zhao | H04W 56/00 |
| | | | 370/328 |
| 2015/0045022 A1 | 2/2015 | Prechner et al. | |
| 2015/0195860 A1* | 7/2015 | Joshi | H04W 36/00 |
| | | | 370/338 |
| 2015/0215939 A1 | 7/2015 | Kikkawa | |
| 2015/0230280 A1* | 8/2015 | Dees | H04W 76/023 |
| | | | 455/39 |
| 2015/0382348 A1* | 12/2015 | Hara | H04W 72/0453 |
| | | | 370/329 |
| 2017/0006614 A1* | 1/2017 | Reddy | H04W 72/046 |

OTHER PUBLICATIONS

Menegato, et al., "Dynamic Clustering in WiFi Direct Technology", In Proceedings of the 12th ACM International Symposium on Mobility Management and Wireless Access, Sep. 21, 2014, pp. 25-29.

Kang, et al., "An Efficient Scanning Group and order Decision Method using Neighbor Network Information in Wireless LAN", In Proceedings of 9th International Symposium on Communications and Information Technology, Sep. 28, 2009, pp. 1292-1296.

Moret, et al., "Access Point Discovery In 802.11 Networks", In Proceedings of IFIP Wireless Days, Nov. 12, 2014, 6 pages.

Chaki, et al., "Seamless Group Reformation in WiFi Peer to Peer Network Using Dormant Backend Links", In Proceedings of 12th Annual IEEE Conference on Consumer Communications and Networking, Jan. 9, 2015, pp. 773-778.

"Why Wi-Fi Direct Cannot Replace Ad-Hoc Mode", Published on: Jul. 13, 2013, Available at: http://www.thinktube.com/tech/android/wifi-direct.

Zhang, et al., "WD2: An Improved Wifi-Direct Group Formation Protocol", In Proceedings of the 9th ACM MobiCom Workshop on Challenged Networks, Sep. 7, 2014, pp. 55-60.

International Preliminary Report on Patentability in counterpart PCT application PCT/US2016/052375, published May 17, 2017.

"Second Written Opinion Issued in PCT Application No. PCT/US2016/052375", dated Feb. 16, 2017, 8 Pages.

\* cited by examiner

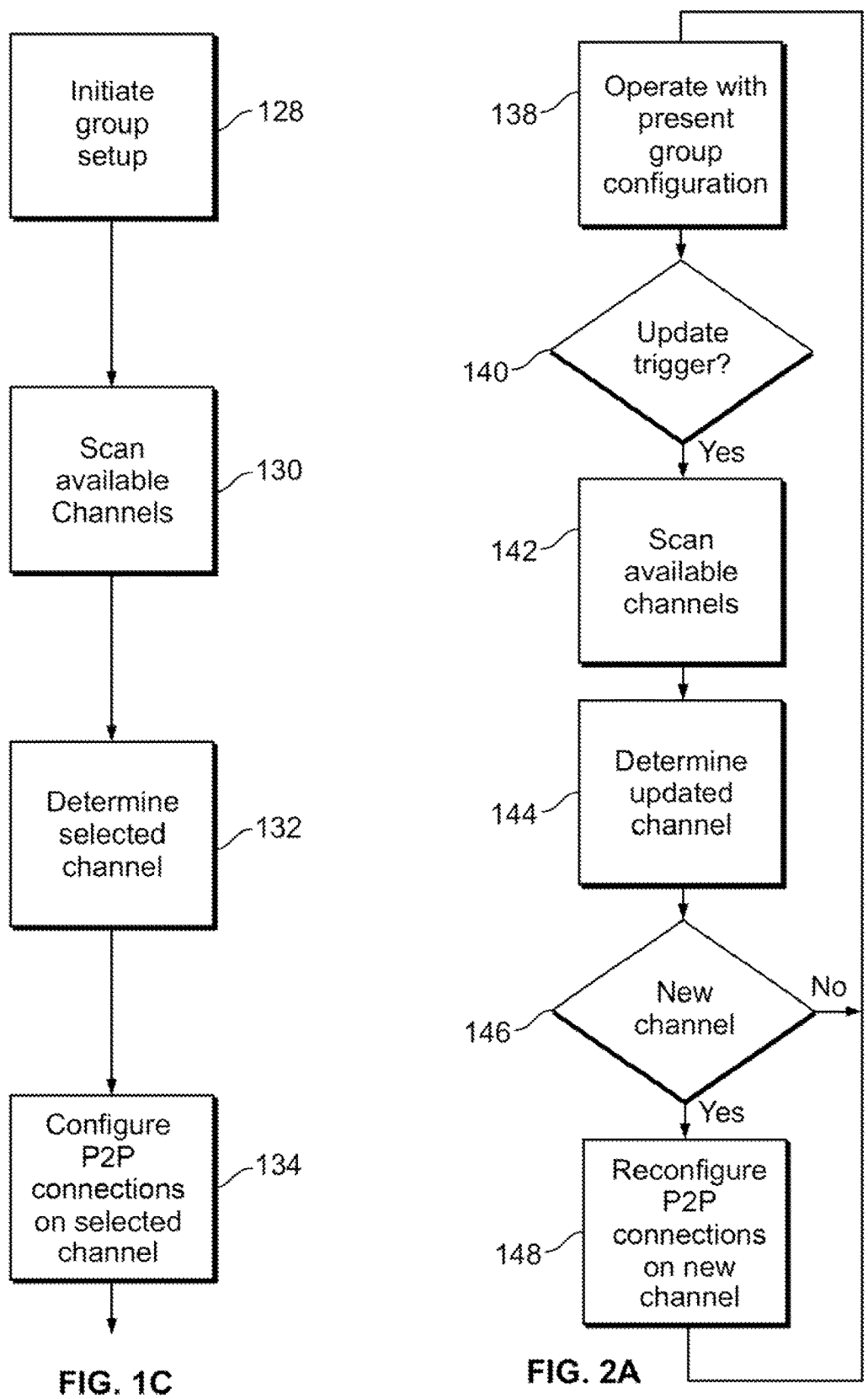

SMART CHANNEL SELECTION FOR AUTONOMOUS GROUP INITIATORS

BACKGROUND

Growth in multimedia data traffic such as video and music has been accompanied by a fundamental shift in how, when and where users access multimedia content. Currently, users have a wide range of devices, such as smartphones, tablets, laptops, TVs, media players, and gaming consoles available for use. These devices are capable of interacting with multiple other types of devices, some of which store content locally and some of which may be used to display content. For example, users may want to stream a video from the internet to a tablet, but display the video on a television in their living room. This type of streaming using sharing of screens and other device features for presentation of media including graphical, video and audio content across devices has been enabled by the development of new technologies with the purpose of making the sharing efficient and seamless.

Technology for implementing the sharing and streaming of multimedia between two or more devices includes direct peer-to-peer technologies such as Wi-Fi Direct or Bluetooth that provide direct connections between devices. In these peer-to-peer technologies, users can transfer data, for example by transmitting messages, streaming content or mirroring a display from one device (the source) to a second device (the display), among others. For example, Wi-Fi Direct allows users to establish a direct. Wi-Fi connection between two or more devices to communicate data directly on a Wi-Fi channel. This eliminates the need for routing the peer-to-peer communications through a network, such as a Wi-Fi Network using access points.

In many cases however, such as during the use of a Wi-Fi Direct peer-to-peer connection, one tar more of the devices in a peer-to-peer connection may also need to maintain a network connection in order to send and receive messages or access the interne for other reasons. The need to maintain multiple connections and the way in which channel resources am allocated in such a scenario may place heavy demands on processing capabilities of the transceivers of devices and may have a negative impact on the performance of one or both of the Wi-Fi Direct peer-to-peer connection and the Wi-Fi network connection. It may also have an impact on device operating efficiency and device resources such as battery power. Additionally, the channel interference environment for the channels of the network in Which the devices are located may be impacted.

SUMMARY

This summary is provided to introduce a selection of concepts in as simplified form that are further described below in the Detailed Description. This summary is not intended to exclusively identify key features or essential features of the claimed subject matter, nor is it intended as an aid in determining the scope of the claimed subject matter.

Systems, methods and apparatus that provide smart channel selection for autonomous group initiators operating within the coverage area of as wireless network are disclosed herein. The disclosed embodiments provide channel selection for a peer-to-peer group that reduces processing and resource demand on group devices when a peer-to-peer connected group device is also operating in the coverage area of another wireless network connection, for example, a wireless local area network (WLAN).

In the embodiments, smart channel selection for autonomous group initiators allows a device acting as a group initiator of a peer-to-peer group to configure the group by determining a selected channel for the peer-to-peer group. The selected channel may be determined by the group initiator device so that it is the channel that group member devices are most likely to use to connect to another available wireless network when group members are also operating on the group peer-to-peer connection. The selected channel for the peer-to peer group being the same as the channel used to connect to the network means that a group member device is not required to operate in a multi-channel mode. Group member devices are not required to operate simultaneously on two separate channels for the peer-to-peer connection and the network connection.

The smart channel selection may be implemented in a first device that is operable to communicate on a peer-to-peer connection as a group initiator with at least one other second device as a group member. The first device may act as group owner or as a group member device once the group is set up. The at least one other second device may be operable to communicate on the peer-to-peer connection and also be operable to communicate with one or more wireless networks on network connections. During setup of a peer-to-peer group the first device may determine a selected channel of operation. The selected channel may be a network channel available to the at least one other second device to communicate with the network on a network connection, for example through an access point, when the at least one other second device is also operating on the peer-to-peer connection. The embodiments are implemented to allow the first device to initiate the peer-to-peer group on the selected channel when the selected channel is the most likely channel to be also used by the at least one other second device to connect to and communicate with the other network. The channel most likely be used by the at least one second device to connect to the network may be selected based on criteria such as signal strength, data rate, stability, latency, frequency band, network service set identifier, or other criteria that may be used by devices to select network channels in the network. When the at least one other second device joins the peer-to-peer group the at least one other second device connects to the peer-to-peer connection on the selected channel. The at least one other second device may then operate using the same channel for both the peer-to-peer and network connections when the at least one second device has connected to the network by choosing the same selected channel for the network connection.

The first device may determine the selected channel by determining that the selected channel is the best channel available to the at least one other second device to connect on a network connection while operating in the vicinity of the first device, in some implementations the first device may have knowledge of the selection method that is used by the at least one other second device to select a network channel and determine the selected channel by the same method. In other implementations the first device may determine the selected channel by a method most likely to be used by the at least one other second device. The first device performs measurements and may make a prediction as to what channel the channel selection function of the at least one other second device will choose for its network connection while in the vicinity of the first device. In example implementations, the best channel may be determined by determining that the selected channel has the highest signal strength or, in one alternative, the fastest data rate channel of channels available to communicate with the network as measured at the first device. By performing measurements at the location of the first device an accurate prediction can be made as to what channel the channel selection function of the at least one other second device will choose for its network connection. Alternatively, the selected channel may be determined by determining, that the selected channel is the only channel available to communicate with the network at the location of the group initiator device based on measurements or information obtained otherwise by the first device. In one implementation, the selected channel may be a Wi-Fi channel that may be utilized for a network connection to an access point of a nearby network and also utilized for a peer-to-peer group configured as a Wi-Fi Direct connection to the first device.

BRIEF DESCRIPTION OF THE DRAWINGS

FIG. 1C is a flow diagram illustrating operations for channel selection performed in an example device;

FIG. 2A is a flow diagram illustrating operations for channel selection performed in an example device;

DETAILED DESCRIPTION

Figure 1A:
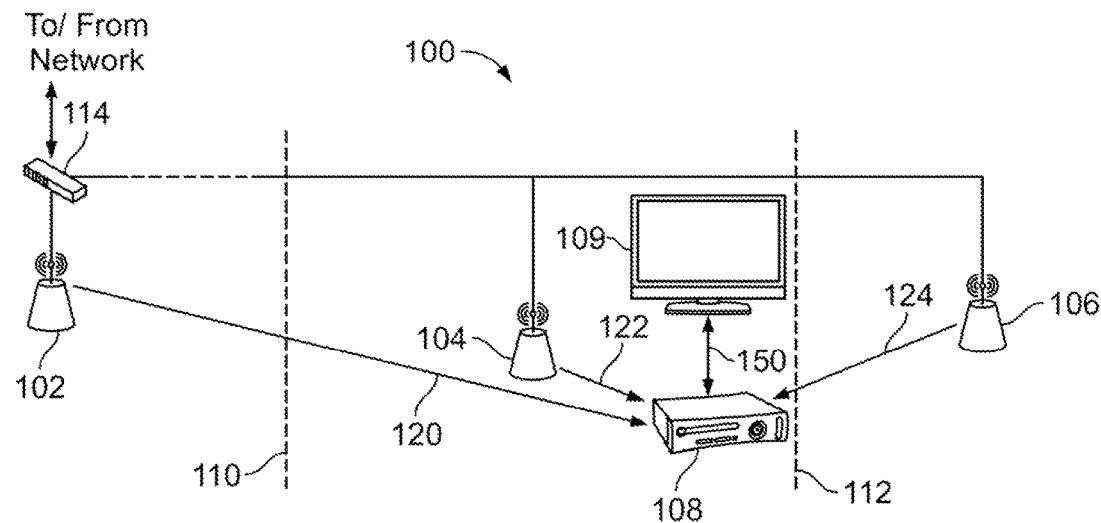
FIG. 1A is a simplified diagram Showing an example device operating according to an embodiment of the disclosure in a wireless network.

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of systems, methods and apparatus that provide smart channel selection for devices operating as autonomous group initiators within a wireless network. The embodiments provide a method of ensuring, or maximizing the probability, that the peer-to-peer connection and the network connection will be made on the same channel when the channel for each connection may be selected from the same channel set. The embodiments provide channel selection for a peer-to-peer group that allows devices operating as group members to connect to the peer-to-peer group connection on the same channel that the devices use to concurrently connect to a wireless network. This avoids simultaneous operation on multiple channels for devices connecting to both of the peer-to-peer connection and another wireless connection and may result in lesser demand on processing capabilities of the transceivers in the devices. It also avoids the negative impact on the performance of one or both of the Wi-Fi Direct connection and the Wi-Fi network connection that operation on multiple channels may cause and may lessen negative impact on device operating efficiency and device resources such as battery power. Embodiments of the disclosure may be utilized, for example, in scenarios in which channel selection for a peer-to-peer group and channel selection for a connection to a wireless network may be selectively made by separate devices.

An example implementation in which the embodiments provide an advantage may be one in which the peer-to-peer connection is configured on Wi-Fi Direct and the infrastructure network connection is configured on a Wi-Fi wireless local area network (WLAN). The embodiments may be implemented in a device that acts as group initiator in configuring the peer-to-peer group and designating the channel to be used tar the peer-to-peer connection. The group initiator device may be a device that receives and presents visual or audio content that may be streamed to the group initiator device by other devices that join the peer-to-peer group. For example, the group initiator device may be a multimedia display device for displaying media content streamed to it by other devices, such as smartphones, tablets, or other mobile devices. The other devices may join the peer-to-peer group intermittently in order to utilize the display or audio capabilities of the group initiator device. In example use cases, the group initiator device may be located within the coverage area of one or more wireless networks such as WLAN that is independent of the peer-to-peer connection. Also, the other devices that are likely to join the peer-to-peer group may have capability to connect simultaneously to the one or more WLANs while connected to the peer-to-peer group. Use of the embodiments in these types of scenarios would result in the Wi-Fi Direct connection and the WLAN connection being made on the same channel. This avoids the need for group member device transceivers to perform multichannel operation on two different Wi-Fi channels simultaneously.

The embodiments allow the group initiator device to select a channel for a peer-to-peer group independent of any knowledge of devices that will be future peer-to-peer group member devices. A technical advantage is provided because the best channel, or potentially best channel, for avoiding multi-channel operations of the group member devices ma be selected with no communication or data exchange done between the group initiator and future group member devices when configuring the peer-to-peer connection channel. Also the channel is selected without channel negotiation taking place when member devices join. Time and resources need not be spent on communications and data exchange between group initiator and group member devices related to the selection, of the channel. However, the selected channel may still be chosen based on a logical selection process. The selection of the channel for the peer-to-peer connection may be based on knowledge available in the environment of the group initiator device. The group initiator may configure the peer-to-peer group on a selected channel most likely to be used by future group member devices to also connect to a wireless network that has coverage in the environment of the group initiator device. Various alternative implementations for choosing the selected channel may be utilized to maximize the probability or ensure that joining member devices use the same channel for both of the wireless network connection and the peer-to-peer group connection when joined to the group. The need for various member devices to operate in a multi-channel mode as they join the group is avoided.

Use of the embodiments also may provide technical advantages that may be realized at a network level. For example, multiple access points of a wireless network may be configured using a particular channel assignment scheme that minimizes channel interference between neighboring access points, by assigning access point channels based on physical locations of access points. When a peer-to-peer group connection is configured in a network by a device using this type of channel assignment scheme, use of the embodiments will cause the group members to be directed to a peer-to-peer connection channel that is the same channel as is assigned to a nearby access point and used by group member devices for network connections to that nearby access point. This is because the channel most likely to be used for network connections in the location of a particular access point where the group devices are operating will be selected by the group initiator device for the peer-to-peer connection. Use of the same local access point channel for the network connection channel and the peer-to-peer connection channel will not conflict or be contrary with the network channel assignment scheme that assigned the network connection channel as the local access point channel.

Use of the embodiments may provide an advantage in a business or organization's wireless networks when devices for multimedia presentation are deployed about the network by IT administrators. In such a network, access points may be deployed on varying channels around the network environment. The embodiments may also provide advantages in the use of multimedia or gaming devices in home environments since home environments typically have one dominant access point in the area, making it easy to predict the access point to which devices will connect. Also, advantages may be provided by performing the selection of the channel for the peer-to-peer connection from particular frequency bands, for example by searching only the 2.4 GHz Wi-Fi band, or only the 5 GHz Wi-Fi band for available channels, or searching both. This type of searching would allow network or IT administrators to narrow the available channels to match those used by their enterprise's collection of client devices. For example, IT administrators might want to limit the channel selected to the 2.4 GHz band because not all enterprise device clients can operate in the 5 GHz band. Alternatively, the administrators might decide that performance, not device compatibility, is a priority, opting instead to limit the channel selected to the higher performance 5 GHz band.

Additionally, the channel for the peer-to-peer connection may be selected based on the service set identifiers of available networks. For example, the channel for the peer-to-peer connection may be selected by the group initiator device from a set of channels associated with a service set identifier of a particular network or networks. The particular network or networks may be networks that are used, or would be preferred for use, to access a network connection by devices that also may join the peer-to-peer connection. Also, the channel for the peer-to-peer connection may be selected from a set of channels that are preferred for a particular operation. For example, the channel for the peer-to-peer connection may be selected by the group initiator device from a set of channels that each have a particular characteristic that makes the channels preferred for a particular operation to be performed by the peer-to-peer group such as high speed streaming.

The embodiments provide an advantage over current methods of configuring channels for peer-to-peer group connections. For example, one current method of selecting a channel for a peer-to-peer group is to choose a default channel that is programmed into a device to use for a peer-to-peer connection when acting as a group initiator device. The group initiator device will then configure all peer-to-peer groups in which it is leader on the default channel and then direct all joining member devices to the default channel. This current method has the problem that the channel is static and doesn't take advantage of the knowledge of the environments in which the group initiator device will be operated. Devices joining the peer-to-peer connection and also connecting to a wireless network may end up being forced to operate in multi-channel mode on different channels of the peer-to-peer and network connections. Also a peer-to-peer connection channel chosen in this manner may interfere with neighboring networks or neighboring access points within a network.

Another example of a current method of selecting a channel for a peer-to-peer group is to have the group initiator device scan and select a channel that is open and unused or carries minimal network data traffic in the location of the group initiator device. The group initiator device will then configure all peer-to-peer groups in which it is leader on the selected channel and direct all joining, member devices to the selected channel. This has the problem that if the selected channel is unused or minimally used in the location of the group initiator device then an channel used for a network connection in that location will most likely not be selected for the peer-to-peer connection channel. Devices joining the peer-to-peer connection and also connecting to a wireless network will be forced to operate in multi-channel mode on different channels on each of the peer-to-peer connection and network connection.

Referring now to FIG. 1A, therein is a simplified diagram showing an example device operating according to an embodiment of the disclosure in a wireless network 100. FIG. 1A shows device 108, which is shown as an exemplary media player device connected to a display 109. Device 108 may operate within the coverage area of wireless network 100 that may include access point (AP) 102, access point (AP) 104, access point (AP) 106, and switch 114. Switch 114 connects AP 102, AP 104, and AP 106 to infrastructure equipment of network 100 that may include, for example, network servers, firewalls, or further connections to the internet or other networks. AP 102, AP 104, and AP 106 each provide communications on wireless channels between network 100 and devices that may be operating in a respective coverage area of each AP 102, AP 104 or AP 106. Network 100 may include more or less APs than are shown in FIG. 1A. Dashed line 110 and dashed line 112 delineate coverage areas of network 100 within which each one AP of AP 102, AP 104 or AP 106 will provide the best channel for a device to communicate with network 100. FIG. 1A shows AP 104 having, a coverage area which may be represented by the area within the borders shown by dashed lines 110 and 112. Lines 110 and 112 are provided for explanatory purposes and arc not drawn to depict any particular physical shape or size of coverage area AP 102 is shown has having a coverage area located to the left of line 110 and AP 106 is shown has having a coverage area located to the right of line 112. Depending on the location of a device within a coverage area the device may be capable of receiving signals from, and potentially communicating, with more than one of the APs of the network. However, a device located in the coverage area of AP 104 will normally select a channel of AP 104 as the best channel to communicate with network 100, for example, by determining the relative signal strength of signals from AP 102, AP 104 and AP 106 or based on other criteria. In the implementation shown in FIG. 1A network 100 may be a wireless local area network (WLAN) that operates according one or more oldie specifications of the IEEE 802.11 Wi-Fi standard.

FIG. 1A shows device 108 operating within the coverage area of AP 104 and operable to detect signals on channels represented by lines 120, 122 and 124, from, respectively, AP 102, AP 104 and AP 106. The channels 120, 122 and 124 may be Wi-Fi channels having channel number, frequency assignments and channel parameters according to the IEEE 802.11 Wi-Fi standard. The example scenario of FIG. 1A may be a situation in which device 108 is initially powered up in the coverage area of AP 104 and in response to the powering up initially configures a peer-to peer network. Alternatively, device 108 may have been moved into the coverage area of AP 104 while operating, and after having configured a peer-to-peer connection, in the coverage area of another AP such as AP 102 or AP 106. Also, while device 108 is shown as a multimedia player device 108 connected to display device 109, device 108 may be implemented as any other type of device with its own output capabilities, such as display or audio, or as connected to devices that provide output functionality. The term node or hub may also be also used to refer to any of these devices. These other types of devices, nodes or hubs may include any type of device in which the embodiments may be implemented, for example, smart phones, tablets, laptop computers, desktop computers, gaming devices, smart televisions, large screen touch devices, home theater systems, smart automobile systems, smart house systems, multimedia cable/television boxes, smart phone accessory devices, tablet accessory devices, adapter hub devices that network multiple devices on peer-to-peer connections, personal digital assistants (PDAs), smart watches, Wi-Fi Direct dongles, Wi-Fi direct adapters, or industrial control systems.

Figure 1B:
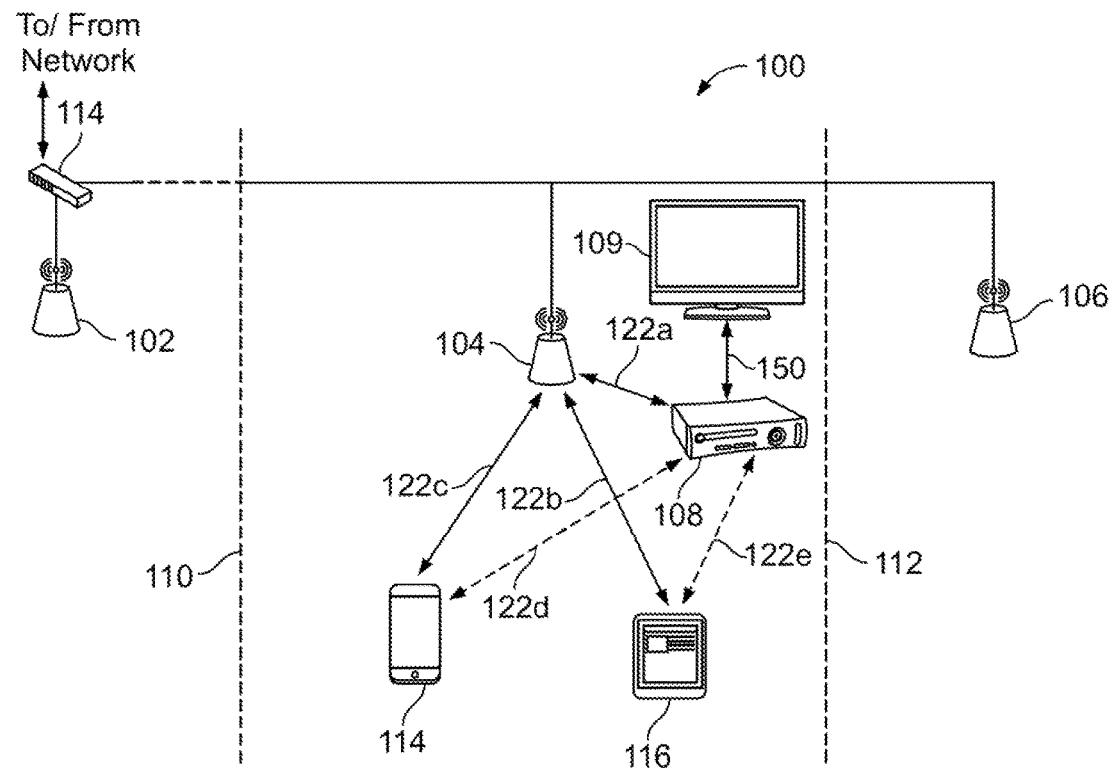
FIG. 1B is a simplified diagram showing an example device performing further operations in a wireless network.

Referring now to FIG. 1B, therein is a simplified diagram showing an example device performing further operations in a wireless network subsequent to configuration of a peer-to-peer network according to the embodiments. FIG. 1B shows device 108 as group leader of a peer-to-peer network as was configured in the scenario shown in FIG. 1A and having group member devices 114 and 116.

The peer-to-peer group setup performed by device 108 in FIG. 1A and FIG. 1B may be explained with reference to FIG. 1C. FIG. 1C is as flow diagram illustrating operations of a process 126 for channel selection that may be performed by device 108 in FIG. 1A and FIG. 1B according to an embodiment. Device 108 may include an appropriate client including computer instructions or code, which may be implemented in software or hardware, for implementing the process of FIG. 1C. Devices 114 and 116 may also include an appropriate client including computer instructions or code, which may be implemented in software or hardware, for performing the operations in the scenarios illustrated in FIG. 1B.

Referring to FIG. 1C, at 128 device 108 initiates group setup. The group setup may be, for example, a peer-to-peer group setup where a device, such as device 108, may setup and configure a peer-to-peer group as autonomous group initiator to provide a function, such as receiving streamed media content, from other devices that join the group. The setup may use autonomous group initiator parameters, such as SSID or security parameters, that were previously configured in device 108 by a device user or network administrator, or are configured in device 108 during group setup at operation 128. For example, device 108 may initiate the setup of peer-to-peer group in which device 108 acts as a group leader and functions to receive and present multimedia streamed from group member devices. In the implementation shown in FIG. 1A, the peer-to-peer group may be implemented according to the IEEE Wi-Fi Peer-to-Peer (P2P) Specification (Wi-Fi Direct). In one example implementation, device 108 may be an IEEE Wi-Fi Miracast device that is configuring a peer-to peer group for other Miracast compliant devices to on over a Wi-Fi Direct connection. In other implementations the device 108 may set up the peer-to-peer group for any other function or activity that may be implemented using a peer-to-peer group. For example, device 108 may function to stream multimedia content to group member devices.

At 130, device 108 scans available Wi-Fi network channels. At 132, device 108 determines a selected channel for configuring the peer-to-peer group. The selected channel may be determined from the results of the scan during operation 128 which would indicate channels available to devices operating near the location of device 108 to communicate with network 100 on a network connection. In the implementation of device 108 shown in FIG. 1A, device 108 determines the channel most likely to be used by peer-to-peer group members by determining the best available channel based on received signal strength as measured at device 108. For example, in FIG. 1A device 108 is in the coverage area of AP 104 and would measure channel 122 of AP 104 as having greater signal strength than channel 120 or channel 124 of AP 102 or AP 106, respectively. In other implementations, criteria such as signal strength, data rate, stability, latency, frequency band, network service set identifier, or other criteria may be used by device 108 to select the most likely to be used by peer-to-peer group members. The determination of 132 may be done by any other way of selecting or determining a channel for the peer-to-peer connection which is based on avoiding multichannel operation for member devices that connect to the peer-to-peer connection and a network simultaneously.

Referring again to FIG. 1C, at 134 device 108, as autonomous group initiator, configures the peer-to-peer connections on the selected channel determined in operation 132. The configuration of the peer-to-peer group connections at 134 includes setting the channel value for the peer-to-peer group in the autonomous group initiator settings within device 108 to the selected channel. Other devices moving into the location and Wi-Fi Direct signal range of device 108 will now broadcast probes or scan for a desired peer-to-peer group, either automatically Of by initiation of the device use and receive information from device 108 operating as group leader on channel 122. Devices desiring to join the peer-to-peer group will then join the group m member devices using channel 122 for the peer-to-peer connection. During the same time, the same devices that move into the location and Wi-Fi Direct signal range of device 108 and join the peer-to-peer group will also move into the location of the area in which device 108 determined that channel 122 was most likely to be used by other devices to connect to network 100. Since these devices are in the same area as device 108, these other devices will connect to network 100 through AP 104 on channel 122.

Referring again to FIG. 1B, FIG. 1B shows device 108 as group leader of as peer-to-peer network as was configured in the scenario shown in FIG. 1A. Device 108 is shown communicating as group leader with device 114 on channel 122, over peer-to-peer connection 122d, and device 116 on channel 122, over peer-to-peer connection 122e, as group members. At this point device 114 and device 116 have moved into the Wi-Fi Direct range of device 108 and joined the peer-to-peer group previously setup on channel 122 by device 108 as group members. Device 114 and 116 have also each scanned and determined available Wi-Fi channels to connect to network 100 while moving into the area near the location of device 108. Based oft the best channel available as determined by the scan of each device, device 114 and device 116 have connected to network 100 through AP 104 on channel 122 over network connections 122c and 122b, respectively. Devices 114 and 115 may now stream media content to device 108 over channel 122 for presentation on display 109. Use of the embodiments of this disclosure in device 108 during peer-to-peer group configuration and setup has resulted in device 114 and device 116 each operating on the same channel for their network connection and peer-to-peer connection. Neither device 114 nor device 116 is forced to operate in multichannel mode.

Figure 2B:
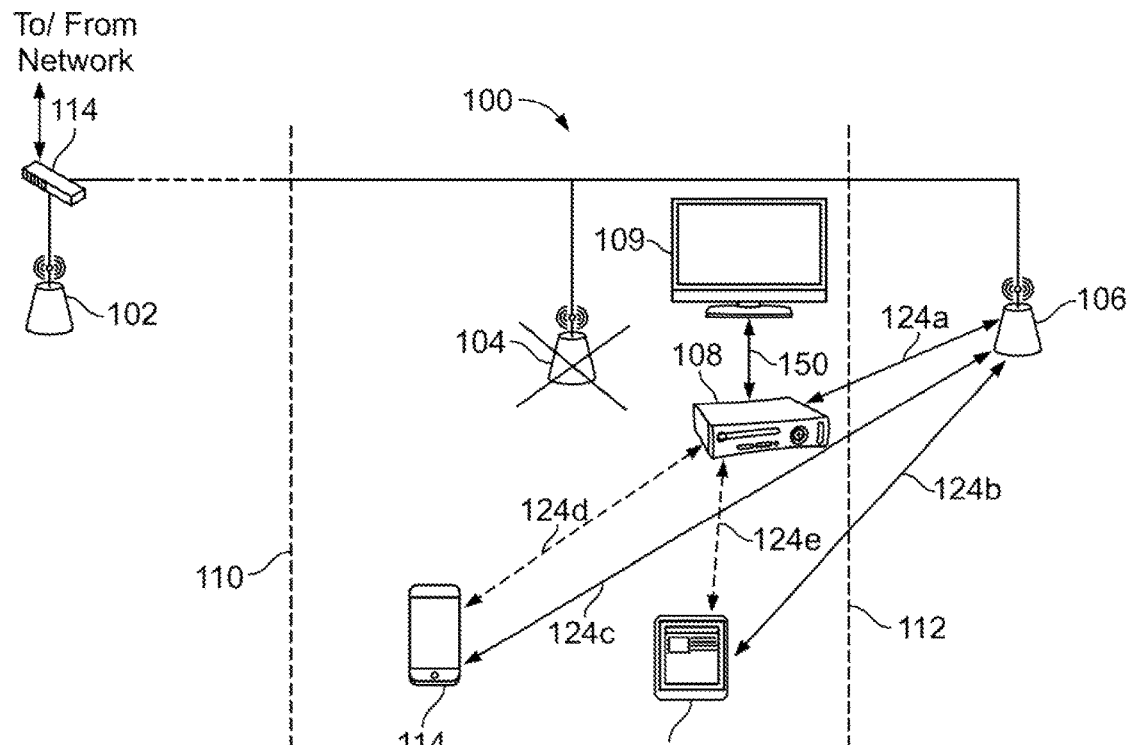
FIG. 2B is a simplified diagram showing an example device according to a further embodiment of the disclosure in a wireless network.

When a peer-to-peer group has been initially configured by the process shown in FIG. 1C, further embodiments may include a process for updating the channel selected for the group configuration. Referring now to FIG. 2A, therein is a flow diagram illustrating operations of a process 136 for updating channel selection that ma be performed by device 108. The process of FIG. 2B may be utilized to update the network channel selected as the channel for the peer-to-peer group in vinous use ease examples. For example, if the group leader is mobile and moves about the coverage area of a network, such as a University campus WLAN or business WILAN, the process of FIG. 2A would keep the peer-to-peer connection on the WLAN channels that are the same channels that would be used by the group members to connect to the WLAN APs. This would avoid forcing the group members to operate in multichannel mode using separate channels on each of the peer-to-peer connection and the WLAN connection. The process of FIG. 2A may also be utilized to avoid multichannel operation for group devices in situations when network APS malfunction, or are taken down for maintenance, and peer-to-peer group member devices change network connection channels to remain connected to the network.

At 138 of FIG. 2A device 108 has been operating as group initiator device of the peer-to-peer group and configured as in the process of FIG. 1C. At 140, during operation as group leader, device 108 may check for, or receive, an update trigger. The update trigger indicates that device 108 may rescan Wi-Fi network channels available for peer-to-peer group member devices, such as devices 114 and 116, or future group member devices, in order to determine if the best available channel for those other devices to connect to the Wi-Fi network 100 has changed. That is, 108 may check to determine if the selected channel 122 is no longer the channel on which group member devices will access network 100. The update trigger may be triggered at a predetermined time period, for example, periodically. The update trigger may also be triggered upon a specific event occurring, for example when reception on the current network channel from AP 104 is lost by the device 108 on connection 122a of FIG. 1B.

At 142 of FIG. 2A, device 108 scans available Wi-Fi channels. The scans at 142 may be performed in the same manner as those performed at 130 of FIG. 1C. Next, at 144, device 108 determines an updated channel. The determination at 144 may be performed in the same manner as the determination performed at 132 of FIG. 1C. In FIG. 2A, if the result of the determination at 144 is a channel that is not new, i.e., if the result of the determination at 130 is the same selected channel as used on network connection 122a, the process returns to 138 and continues to operate as shown in FIG. 1B. However if a new channel has been determined at 144 to be the best available channel for devices such as device 114 or device 116 to connect to the network 100, device 108 reconfigures the peer-to-peer connections at. 148 using the new channel as the selected channel on which the group is configured. The process then moves to 138 and device 108 operates the peer-to-peer group on the reconfigured selected channel.

Referring now to FIG. 2B, therein is as simplified diagram showing an example device operating according to an embodiment in wireless network 100. FIG. 2B shows device 108 operating within the physical coverage area of AP 104 in an example scenario that may occur subsequent to the process of FIG. 2A. In FIG. 2B, the example scenario is one in which AP 104 has malfunctioned subsequent to initial setup of the peer-to-peer group and is not operating, or has been removed from the network and device 108 has lost the network connection 122a. In the example scenario of FIG. 2B, the peer-to-peer connection for the group having device 108 as group leader is shown as now updated and configured on channel 124 with peer-to-peer connections 124d and 124e to devices 114 and 116, respectively. Device 108 is shown communicating as group leader with device 114 on channel 124, over peer-to-peer connection 124d, and device 116 on channel 124, over peer-to-peer connection 124e, as group members. At this point device 114 and device 116 have moved into the Wi-Fi Direct range of device 108 and joined the peer-to-peer group on updated channel 124 as group members. Device 0 114 and 116 have also each scanned and determined available Wi-Fi channels to connect to network 100 while moving into the area near the location of device 108. Based on the best channel available as determined by the scan of each device, device 114 and device 116 have connected to network 100 through AP 104 on channel 124 over network connections 124c and 124b, respectively. Neither device 114 nor device 116 is forced to operate in multichannel mode. In example implementations, the update process of FIG. 2A may be performed subsequent to the initial configuration of the peer-to-peer group before any group member devices join the group to keep the selected channel of the group configuration current. In other implementations, the update process of FIG. 2A may be performed alter group member devices join the group and connect on the peer-to-peer connection. In this case the process may keep the group configuration with the selected channel current and the peer-to-peer connection and the network connections on the same channel.

Figure 3A:
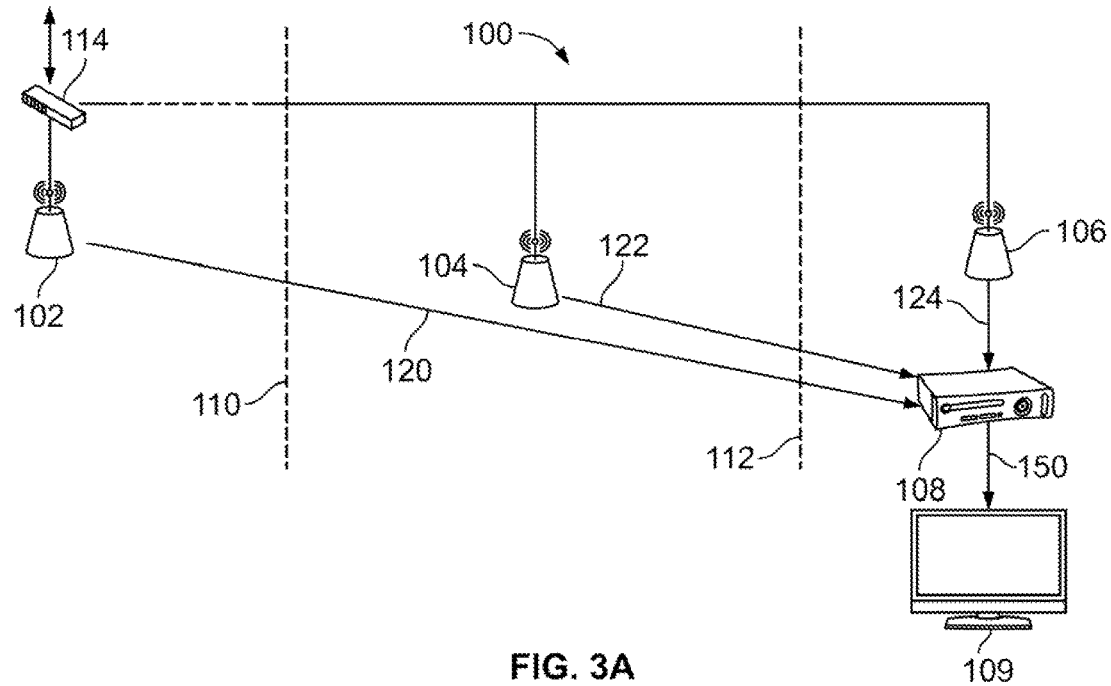
FIG. 3A is a simplified diagram shown an example device operating according to an embodiment of the disclosure in a wireless network.
Figure 3B:
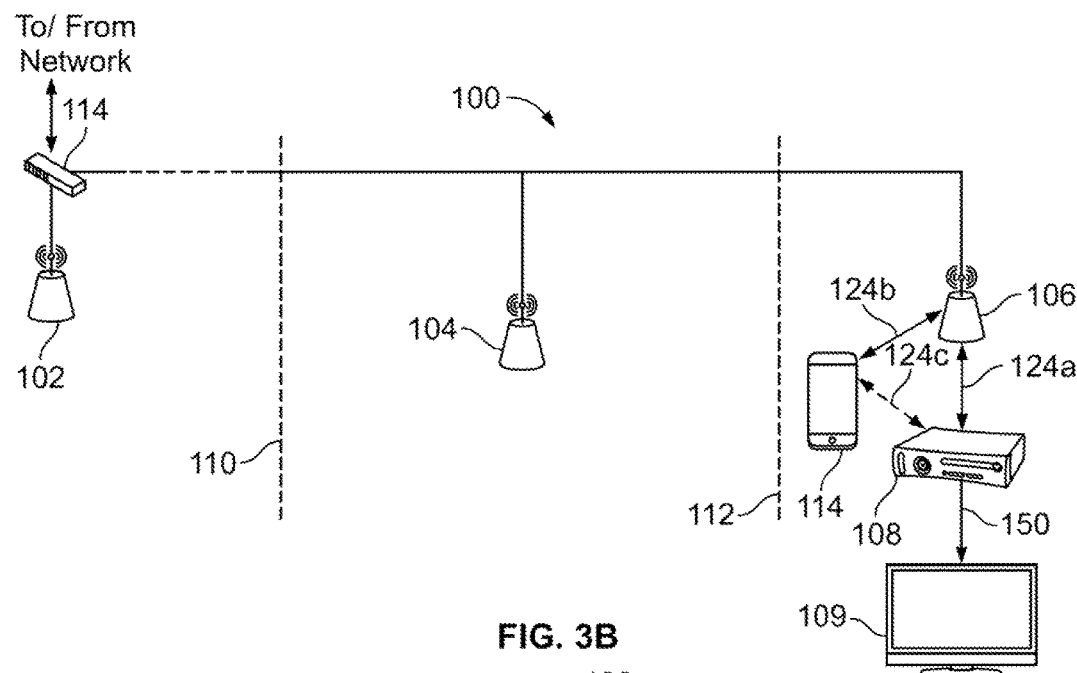
FIG. 3B is a simplified diagram showing an example device performing further operations in a wireless network.

Referring now to FIGS. 3A and 3B, therein are simplified diagrams showing other example scenarios of device 108 operating in network 100. FIG. 3A and 3B show a scenario that may occur for example, when device 108 is powered up in the coverage area of AP 106 in network 100 without the peer-to-peer group configured and stored in device 108 beforehand. In that case device 108 will begin the group setup process of FIG. 1C at 128. Device 108 will scan available network channels 120, 122 and 124 of APs 102, 104 arid 106, respectively, at 120, determine channel 124, which is the strongest channel, as the selected channel at 120 and, at 134, configure the peer-to-peer group on the selected channel 124. In one alternative example scenario, device 108 may have already configured the peer-to-peer group while located elsewhere in network 100, such as while located in the coverage area of AP 104 as shown in the example of FIG. 1A. In this case device 108 may move, or be moved, into the coverage area of AP 106 with the peer-to-peer group already configured. Device 108 may then perform the process of FIG. 2A by initially operating with the existing group configuration at 138, receiving update trigger at 140, scanning available network channels at 142, determining a new selected channel at 144, determining that the selected channel is new, and, at 148, configuring the peer-to-peer group at on the new channel. The trigger may be for example, either a periodic update trigger or a trigger generated upon losing reception of the network channel of the AP providing the coverage area from which device 108 moves.

FIG. 3B shows an example scenario subsequent to peer-to-peer group setup at either 134 of FIG. 1C or 148 of FIG. 2A in the example scenarios described in relation to FIG. 3A. In FIG. 3B device 114 has moved into the proximity of device 108 and joined the peer-to-peer group connection set up by device 108. Device 114 has connected to the peer-to-peer group connection 124*c* using channel 124, as was configured for the group, on connection 124*c*. Device 114 also has scanned and found channel 124 as the best available network channel to connect to the network on connection 124*b* to AP 106. Device 114 is operating on the same channel for both of peer-to-peer connection 124*c* and network connection 124*b* and is not forced to operate in multichannel mode as result of those two connections.

The embodiments have been described with device 108 being the group initiator and group owner. In alternative implementations a device, such as device 108, may be group initiator and select the channel most likely to be used by peer-to-peer group members but the group owner role may be performed by another device that subsequently joins the peer-to-peer group. In these implementations the initiator device may configure the peer-to-peer connection at the initiator device by connecting as group member or sending the information on the channel selection to members of the group. The term initiator or group initiator includes any device, node or apparatus that determines or selects the channel to be used for the peer-to-peer connection according to the embodiments disclosed herein.

Additionally, while the embodiments have been described showing network 100 as a wireless local area network (WLAN), in alternative embodiments the network may be any type of network that provides a connection to devices that may concurrently connect to both of the network connection and the peer-to-peer network connection initiated by a device such as device 108. For example, the network may be a second peer-to-peer group connection and a device, such as device 108, may select a channel most likely to be used for the second peer-to-peer connection as the channel for the peer-to-peer connection which it is initiating. The term network includes any peer-to-peer device connection, network, or system that may provide a connection to a device also connected to the peer-to-peer network connection initiated by a device such as device 108.

Figure 4:
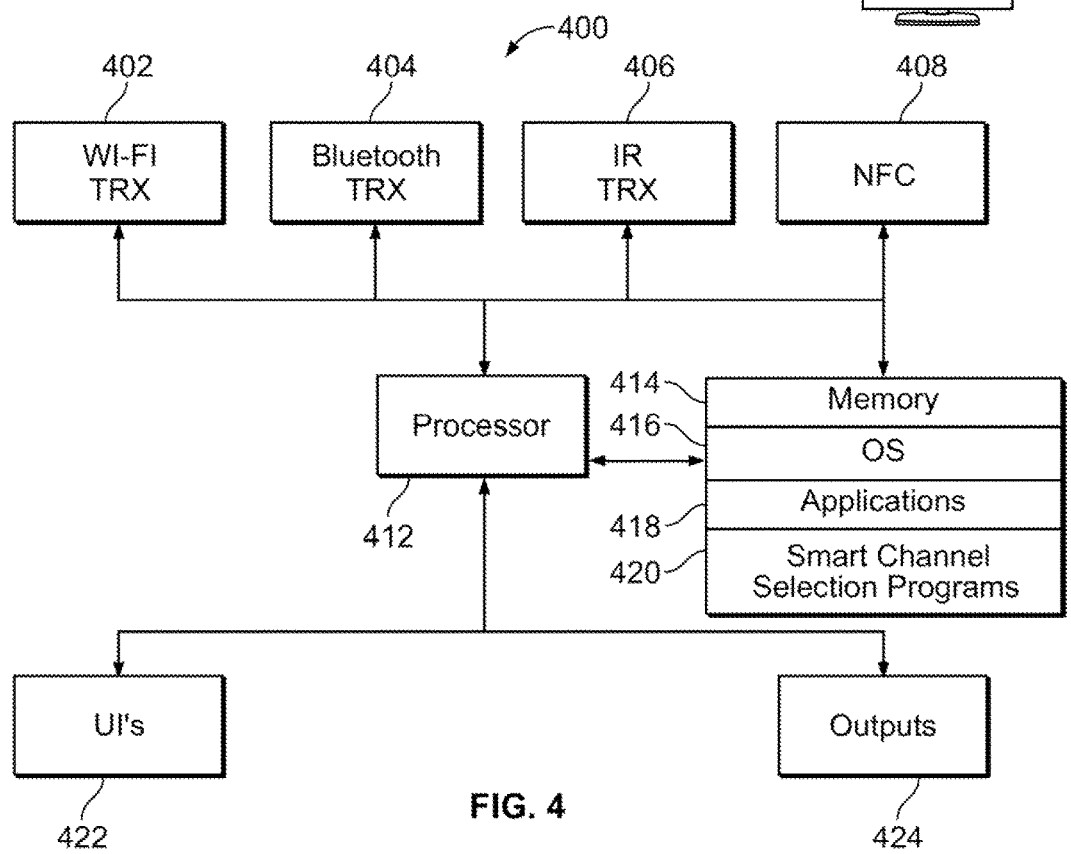
FIG. 4 is a simplified block diagram of an example implementation of a device.

Referring now to FIG. 4 therein is a simplified block diagram of an example implementation of a device 400. Device 400 represents a possible implementation of device 108, or any other device, hub, or node, in which embodiments of the disclosure may be implemented. Device 400 may include user interfaces (UIs) 422 that may include, for example, a touch screen or keypad, a microphone, speakers, or camera which receive inputs and provide outputs to and from a user of device 400. Device 400 includes processor 412 and memory/storage 414 which is shown as including computer program code or instructions for Smart Channel Selection Programs 420. When executed, Smart Channel Selection Programs 420 cause processor 412 to control device 400 to implement peer-to-peer group configuration by performing the processes of FIGS. 1B and 2A tot selecting a peer-to-peer connection channel and for configuring the peer-to-peer connection when device 400 acts as group leader device. Memory 414 also includes code or instructions for the device operating system (OS) 416 and other device applications 418.

Memory 414 may be implemented as any type of computer readable storage media in device 400, including non-volatile and volatile memory. Memory 414 also may include data such as media data, camera photos and videos, contact data, calendar data, and other files used in the operation of applications on device 400. Processing unit 412 may comprise one or more processors, or other control circuitry or any combination of processors and control circuitry. Processing unit 412 provides overall control of device 400 and the other functional blocks shown in FIG. 4 by executing instructions or code in memory 414 to provide necessary functions for operation of device 400 in the disclosed embodiments of the Smart Channel Selection for Autonomous Group Initiators.

Device 400 includes transceivers (TRXs) operating, in different frequency bands as shown by Wi-Fi TRX 402, Bluetooth TRX 404, and IR TRX 406. Device 400 also includes NFC interface 208. In the embodiments, device 400 and its transceivers may be operable to use one or more spectrum allocations that are allowed in each of the designated frequency bands. For example, Wi-Fi TRX 401 may operate on frequency bands and channels implemented according to the relevant IEEE 802.11 standard specifications supported by device 400 to implement Wi-Fi network connections and Wi-Fi Direct connections. The functions shown in FIG. 4 may also be implemented in a device having cellular capabilities in addition to the illustrated functions. Various implementations of devices, nodes or hubs according to the embodiments may include more or less functions than those shown in FIG. 4.

The example embodiments disclosed herein may be described in the general context of processor-executable code or instructions stored on memory that may comprise one or more computer readable storage media (e.g., tangible non-transitory computer-readable storage media such as memory 414). As should be readily understood, the terms "computer-readable storage media" or "non-transitory computer-readable media" include the media for storing of data, code and program instructions, such as memory 414, and do not include portions of the media for storing transitory propagated or modulated data communication signal.

The embodiments disclosed herein include a first device comprising at least one processor and memory. The memory, includes code executable to cause the at least one processor to control the first device to determine a selected channel available to at least one second device to communicate with a network on a network connection when the first device is operating in the coverage, area of the network and configure a peer-to-peer connection on the selected channel. The first device may configure the peer-to-peer connection on the selected channel by configuring a peer-to-peer group on the selected channel, with the first device as group owner. The selected channel may comprise a Wi-Fi channel of an access point of the network and the peer-to-peer group may be configured as a Wi-Fi Direct connection. The code may be executable to cause the at least one processor to control the first device to determine the selected channel by determining that the selected channel is the most likely channel to be used by the at least one other device to communicate with the network. The code may be further executable to cause the at least one processor to control the first device to determine the selected channel, by determining that the selected channel, is the only channel available to communicate with the network at the location of the first device.

The network may have at least one channel available to the at least one other device to communicate with the network and the code may be executable to cause the at least one processor to control the first device to determine the selected channel by determining that the selected channel is the best channel of the at least one channel available. The code may be further executable to cause the at least one processor to control the first device to determine that the selected channel is the best channel by determining that the selected channel has the highest received signal strength of the at least one channel available to the at least on other device as measure at the first device. The code may be farther executable to cause the at least one processor to control the first device to determine that the selected channel is the best channel available by determining that the selected channel has the fastest data rate of the at least one of channel available to communicate with the network as measured at the first device. The code may be further executable to cause the at least one processor to control the first device to determine that the selected channel is the best channel based on stabilities of the available channels. The code may also be further executable to cause the at least one processor to control the first device to determine that the selected channel is the best channel based on latencies of the available channels, or executable to cause the at least one processor to control the first device to determine the selected channel based on a service set identifier. Additionally, the code may be further executable to cause the at least one processor to control the first device to determine the selected channel based on a service set identifier.

The code may be further executable to cause the at least one processor to control the first device to configure the peer-to-peer group set up on the selected channel by transmitting peer-to-peer group information. The code may be further executable to cause the at least one processor to determine the selected channel from a selected frequency band of a plurality of network frequency bands where the code may be executable to cause the at least one processor to control the first device to determine the selected channel from a 2.4 GHz frequency band or the code may be executable to cause the at least one processor to control the first device to determine the selected channel from a 5 GHz frequency band.

The embodiments of the disclosure also include a method for configuring a peer-to-peer group at a first device comprising determining a selected channel, the selected channel available to at least one second device for communications with as network on as network connection, and configuring the peer-to-peer connection on the selected channel. The configuring of the peer-to-peer connection on the selected channel may comprise configuring a peer-to-peer group on the selected channel with the first device as group owner. The determining of the method may comprise determining as channel of an access point of the network and the configuring may comprise configuring a group for a Wi-Fi Direct connection. The determining of the method may further comprise determining that the selected channel is the most likely channel to be used by the at least one second device to communicate with the network. The configuring of the method may farther comprise configuring a peer-to-peer group for set up with the at least one second device on the selected channel by storing information on the selected channel in a memory of the first device. The configuring of the method may also further comprise broadcasting peer-to-peer connection information on the selected channel from the first device.

The embodiments further include a node comprising at least one processor and memory including code. The code is executable to cause the at least one processor to control the node to determine a selected channel, the selected channel available to at least one device to communicate with a network on a network connection when the at least one device is in proximity to the node, and configure a peer-to-peer group on the selected channel with the node as group initiator. The code may be further executable to cause the at least one processor to control the node to determine a selected channel by determining that the selected channel is most likely to be used by the at least one device to communicate with the network. The selected channel may comprise a channel of at least one channel available to the at least one device to communicate with the network and the code may be executable to cause the at least one processor to control the node to determine the selected channel by determining that the selected channel has the highest signal strength of the at least one channel as measured by the apparatus. The selected channel may comprise a Wi-Fi channel of an access point of the network and the peer-to-peer group may be configured for a Wi-Fi Direct connection.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that in be used include field programmable gate arrays (FPGAs), application specific integrated circuits (ASICs), application specific standard products (ASSPs), system-on-a-chip systems (SOCs), complex programmable logic devices (CPLDs) etc. Use of the term processor or processing unit in this disclosure is mean to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, those elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:
1. A first device comprising:
at least one processor and memory, the memory including code executable to cause the at least one processor to control the first device to:
scan for available channels associated with networks;

determine a selected channel, from the available channels, that a second device is likely to use when, in the future, the second device connects to a selected network associated with the selected channel, the selected channel being determined based at least on one or more of: a determination that the selected channel is the only channel available to communicate with the selected network at the location of the first device, received signal strengths for signals received from the available channels, data rates of the available channels, stabilities of the available channels, latencies of the available channels, or a service set identifier; and configure a peer-to-peer group on the selected channel prior to the second device connecting to the selected network, wherein the peer-to-peer group is joinable by the second device.

2. The first device of claim 1, wherein the code is executable to further cause the at least one processor to control the first device to configure the peer-to-peer group on the selected channel with the first device as group owner.

3. The first device of claim 1, wherein the selected channel comprises a Wi-Fi channel of an access point of the selected network and the peer-to-peer group is configured on a Wi-Fi Direct channel.

4. The first device of claim 1, wherein the code is executable to cause the at least one processor to control the first device to determine the selected channel based at least on the determination that the selected channel is the only channel available to communicate with the selected network at the location of the first device.

5. The first device of claim 1, wherein the selected network has a plurality of channels available to the second device to communicate with the selected network, and the selected channel is the best channel of the plurality of channels that the second device is likely to use to connect to the selected network.

6. The first device of claim 1, wherein the code is executable to cause the at least one processor to control the first device to determine the selected channel based at least on the received signal strengths for the signals received from the available channels.

7. The first device of claim 1, wherein the code is executable to cause the at least one processor to control the first device to determine the selected channel based at least on the data rates of the available channels.

8. The first device of claim 1, wherein the code is executable to cause the at least one processor to control the first device to determine the selected channel based at least on the stabilities of the available channels.

9. The first device of claim 1, wherein the code is executable to cause the at least one processor to control the first device to determine the selected channel based at least on the latencies of the available channels.

10. The first device of claim 1, wherein the code is executable to cause the at least one processor to control the first device to determine the selected channel based at least on the service set identifier.

11. The first device of claim 1, wherein the code is executable to further cause the at least one processor to control the first device to configure the peer-to-peer group on the selected channel by transmitting peer-to-peer connection information to the second device.

12. The first device of claim 1, wherein the code is executable to cause the at least one processor to determine the selected channel from a selected frequency band of a plurality of network frequency bands.

13. The first device of claim 12, wherein the code is executable to cause the at least one processor to control the first device to determine the selected channel from a 2.4 GHz frequency band.

14. The first device of claim 12, wherein the code is executable to cause the at least one processor to control the first device to determine the selected channel from a 5 GHz frequency band.

15. A method, comprising:
scanning, at a first device, for available channels associated with networks;
determining, at the first device, a selected channel, from the available channels, that a second device is likely to use when, in the future, the second device connects to a selected network associated with the selected channel, the selected channel being determined based at least on one or more of: a determination that the selected channel is the only channel available to communicate with the selected network at the location of the first device, received signal strengths for signals received from the available channels, data rates of the available channels, stabilities of the available channels, latencies of the available channels, or a service set identifier; and
configuring, at the first device, a peer-to-peer group on the selected channel prior to the second device connecting to the selected network, wherein the peer-to-peer group is joinable by the second device.

16. The method of claim 15, wherein the peer-to-peer group is configured on the selected channel with the first device as group leader.

17. The method of claim 15, wherein the determining comprises determining a Wi-Fi channel of an access point of the selected network and the configuring comprises configuring a Wi-Fi Direct connection.

18. The method of claim 15, wherein the peer-to-peer group is configured for set up with the second device on the selected channel by storing information on the selected channel in a memory of the first device.

19. The method of claim 15, wherein the configuring further comprises broadcasting peer-to-peer connection information from the first device.

20. A node, comprising:
at least one processor and memory, including code executable to cause the at least one processor to control the node to:
scan for available channels;
determine a selected channel, from the available channels, that a device is likely to use when, in the future, the device connects to a selected network using the selected channel, the selected channel being determined based at least on one or more of: a determination that the selected channel is the only channel available to communicate with the selected network at the location of the node, received signal strengths for signals received from the available channels, data rates of the available channels, stabilities of the available channels, latencies of the available channels or a service set identifier; and
configure a peer-to-peer group on the selected channel prior to the device connecting to the selected network, wherein the peer-to-peer group is joinable by the device.

21. The node of claim 20, wherein the selected network comprises a plurality of channels available to the device to communicate with the selected network and the code is executable to cause the at least one processor to control the node to determine the selected channel by determining that the selected channel has the highest signal strength of the plurality of channels as measured by the node.

22. The node of claim 20, wherein the selected network comprises a plurality of channels available to the device to communicate with the selected network and the code is executable to cause the at least one processor to control the node to determine the selected channel by determining that the selected channel has the fastest data rate of the plurality of channels as measured by the node.

23. The node of claim 20, wherein the code is executable to cause the at least one processor to control the node to determine the selected channel based at least on stabilities of a plurality of channels available to the device to communicate with the selected network.

24. The node of claim 20, wherein the code is executable to cause the at least one processor to control the node to determine the selected channel based at least on latencies of a plurality of channels available to the device to communicate with the selected network.

25. The node of claim 20, wherein the code is executable to cause the at least one processor to control the node to determine the selected channel based at least on the service set identifier.

26. The node of claim 20, wherein the selected channel comprises a Wi-Fi channel of an access point of the selected network and the peer-to-peer group is configured for a Wi-Fi Direct connection.

27. The first device of claim 1, wherein the memory further includes code executable by the at least one processor to control the first device to:
   rescan for new available channels;
   determine a new selected channel from the new available channels; and
   reconfigure the peer-to-peer group on the new selected channel.

28. The method of claim 15, further comprising:
   rescanning, at the first device, for new available channels;
   determining, at the first device, a new selected channel from the new available channels; and
   reconfiguring, at the first device, the peer-to-peer group on the new selected channel.

29. The node of claim 20, wherein the memory further includes code executable by the at least one processor to control the node to:
   rescan for new available channels;
   determine a new selected channel from the new available channels; and
   reconfigure the peer-to-peer group on the new selected channel.

* * * * *